United States Patent
Matsuura

(10) Patent No.: US 6,550,063 B1
(45) Date of Patent: Apr. 15, 2003

(54) NETWORK INTERFACE MODULE FOR RECEIVING CABLE TELEVISION BROADCASTING

(75) Inventor: Syuuji Matsuura, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/293,845

(22) Filed: Apr. 19, 1999

(30) Foreign Application Priority Data

May 21, 1998 (JP) .......................................... 10-140272

(51) Int. Cl.[7] .............................................. H04N 7/173
(52) U.S. Cl. ...................... 725/133; 725/121; 725/151; 725/143; 725/131; 725/128; 725/127; 348/725
(58) Field of Search ................................ 725/128, 127, 725/121, 151, 133, 153, 131, 143; 375/216; 348/725–731, 738; 455/301

(56) References Cited

U.S. PATENT DOCUMENTS

| | | | |
|---|---|---|---|
| 3,679,829 A | | 7/1972 | Hofmeister et al. |
| 4,494,095 A | * | 1/1985 | Noji et al. ................. 174/35 R |
| 4,569,084 A | * | 2/1986 | Takahama ................... 455/131 |
| 4,689,825 A | * | 8/1987 | Geiger et al. ............. 455/180.2 |
| 4,920,455 A | | 4/1990 | Maier etal. |
| 5,109,286 A | * | 4/1992 | West et al. .................... 380/52 |
| 5,587,734 A | * | 12/1996 | Lauder et al. ............... 348/731 |
| 5,638,112 A | * | 6/1997 | Bestler et al. ............... 348/584 |
| 5,745,836 A | * | 4/1998 | Williams ..................... 725/106 |
| 5,870,513 A | * | 2/1999 | Williams ..................... 359/113 |
| 5,956,075 A | * | 9/1999 | Matsuo ........................ 725/124 |

FOREIGN PATENT DOCUMENTS

| | | |
|---|---|---|
| EP | 130 427 A1 | 1/1985 |
| JP | 2246199 | 10/1990 |
| JP | 5191807 | 7/1993 |
| WO | 93/22877 | 11/1993 |
| WO | 98/12874 | 3/1998 |

* cited by examiner

*Primary Examiner*—Andrew Faile
*Assistant Examiner*—Christopher R Nalevanko
(74) *Attorney, Agent, or Firm*—Birch, Stewart, Kolasch & Birch, LLP.

(57) ABSTRACT

An HPF for blocking an upstream signal and passing a downstream signal, an LPF for blocking the downstream signal and passing only an upstream data signal, a directional coupler for branching, and a high frequency relay for forming a through line are built in a shielded package integrally as a high frequency module, so as to restrain noise produced by a digital circuit from interfering. This enables the analogue circuit of the high frequency module and the other digital circuits to be built integrally in a network interface module mounted in a cable television set-top box. In addition, a single tuner is used for both analogue and digital signals. In doing so, the switching of an AGC voltage is problematic, which is done by an AGC switching circuit. With a network interface module mounted in a cable television set-top box, the circuit arrangement can be hence simplified, and improvements can be made on cost, size and power consumption.

5 Claims, 3 Drawing Sheets

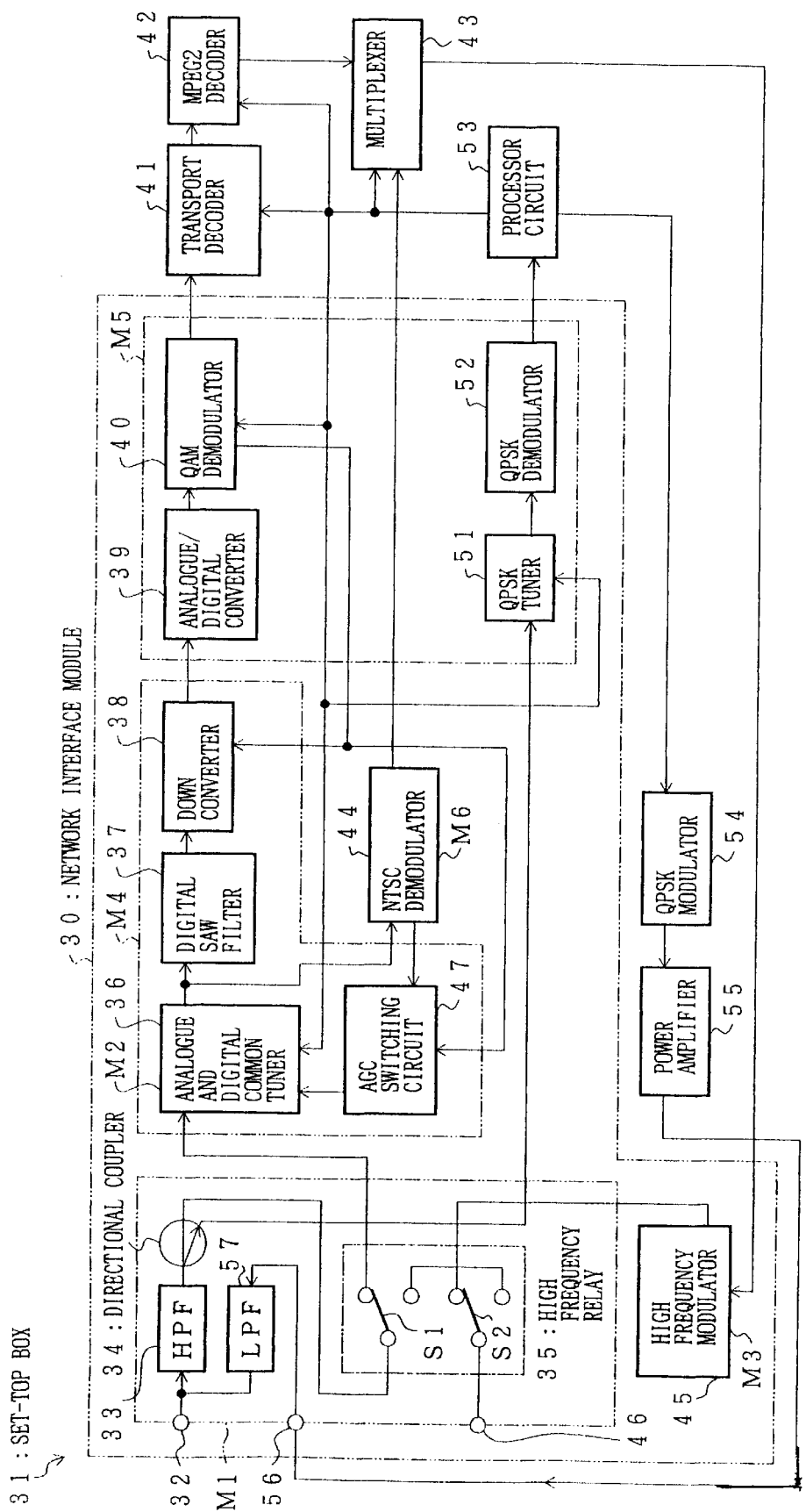
F I G. 1

NETWORK INTERFACE MODULE FOR RECEIVING CABLE TELEVISION BROADCASTING

FIELD OF THE INVENTION

The present invention relates to a network interface module suitably used as a cable television cable modem and a set-top box.

BACKGROUND OF THE INVENTION

Cable television companies are building arterial networks in increasing numbers, using optical fiber or HFC (hybrid fiber/coax) to offer multi-channel and wide band data communication service by way of empty channels, even when a coaxial cable is used for the lead-in line into individual homes. Consequently, by using 64-value QAM (Quadruture Amplitude Modulation), a high speed data line can be established such that a single channel has a bandwidth of 6 MHz and the transmission rate is 30 Mbps. In the above-noted cable modem or set-top box, a network interface module is mounted for establishing a connection to such a cable network.

FIG. 3 is a block diagram showing an electrical arrangement of a typical conventional set-top box 1. A downstream signal ranging, for example, from 54 to 860 MHz is supplied for input to an input terminal 2 from a cable line, and an upstream signal ranging, for example, from 5 to 42 MHz is supplied for output to the cable line from the input terminal 2.

In recent years, the downstream signal in cable television broadcasting is constituted by analogue NTSC visual and audio signals, digital QAM visual and audio signals, and a QPSK (Quadruture Phase Shift Keying Modulation) data signal. Therefore, the downstream signal, having been filtered by a high pass filter 3 that is an intermediate frequency filter having 5 to 46 MHz as an attenuation band and 54 MHz or higher as a passing band, is first separated by a directional coupler 4, then supplied for input to a digital tuner 5, and supplied to an analogue tuner 7 and a QPSK tuner 8 via a half-separator 6.

The tuners 5, 7, and 8 are each constituted by a receiver circuit for a UHF band covering 470 to 860 MHz (B3 band), another one for VHF High band covering 170 to 470 MHz (B2 band), and another one for VHF Low band covering 54 to 170 MHz (B1 band). However, there is no particular specification for band separation.

An intermediate frequency signal of digital television broadcasting of the desired channel selected through the digital tuner 5, having gone through a digital SAW filter 9, is supplied to a down converter 10 to be converted to an intermediate frequency signal of a low frequency, and converted to an 8- or 10-bit digital signal by an analogue/digital converter 11. The digital signal is I,Q-demodulated by a QAM demodulator 12, error-corrected, and supplied for output to a transport decoder 13 as a serial bit stream. The transport decoder 13 extracts visual and audio signals from the serial bit stream and supplies the extracted signals to an MPEG2 decoder 14. The MPEG2 decoder 14 decodes the bandwidth of the incoming visual and audio signals, and sends out the decoded signals to a multiplexer 15 as analogue NTSC composite visual and audio signals.

Meanwhile, an intermediate frequency signal of analogue television broadcasting of the desired channel selected through the analogue tuner 7 is demodulated into analogue NTSC composite visual and audio signals by an NTSC demodulator 16. The composite visual and audio signals from the MPEG2 decoder 14 and NTSC demodulator 16 are selected by the multiplexer 15, converted into a television signal of a desired channel such as channel 1, 2, or 13 by a high frequency modulator 17, and supplied for output from an output terminal 18 to an antenna input terminal of a television set.

A data signal selected through the QPSK tuner 8 is demodulated by the a QPSK demodulator 19 and supplied to a processor circuit 20 realised by a microprocessor and other components. Upstream data such as information on viewing fees, incidentally, is supplied for input to a QPSK modulator 21 from the processor circuit 20 to be modulated, amplified by a power amplifier 22, thereafter led in to a data terminal 23, and led out to the input terminal 2 via a low pass filter 24 that is an upstream circuit.

In the conventional set-top box 1 arranged in the above manner, a network interface module is structured from the high pass filter 3, the low pass filter 24, the directional coupler 4, the half-separator 6, the tuners 5, 7, and 8, the digital SAW filter 9, the down converter 10, the analogue/digital converter 11, the QAM demodulator 12, the NTSC demodulator 16, and the QPSK demodulator 19.

Therefore, in such a network interface module, digital noise and high frequency noise are produced in high frequency circuits including the tuners 5, 7, and 8, the high pass filter 3, the low pass filter 24, the directional coupler 4, and the half-separator 6 by the processor circuit 20, the QPSK modulator 21, the QPSK demodulator 19, the QAM demodulator 12, etc., and degrade properties, such as C/N, BER (Bit Error Rate) and phase noise, representing digital demodulation performance. This is problematic in designing a set-top box.

For these reasons, as a conventional counter-measure to solve the noise problem, the high pass filter 3, the low pass filter 24, the digital tuner 5, the analogue tuner 7, QPSK tuner 8, and the high frequency modulator 17 are built in respective individual shielded cases so as to be handled as separate high frequency components. Consequently, when assembled into a set-top box, those high frequency components need to be assembled, making a complex arrangement inevitable and rendering the assembled set-top box expensive, bulky, and power-consuming.

SUMMARY OF THE INVENTION

The present invention has an object to offer a network interface module capable of providing a simpler arrangement and improvements on cost, size and power consumption.

The network interface module in accordance with the present invention is a network interface module for receiving cable television broadcasting, and, to achieve the above object, is characterised in that it comprises:

a low pass filter for transmitting an upstream signal to a cable television station;

a high pass filter for blocking the upstream signal and receiving a downstream signal from the cable television station; and a directional coupler for supplying the downstream signal to a visual and audio signal receiver circuit and a control signal receiver circuit, wherein the low pass filter, the high pass filter, and the directional coupler form a high frequency circuit built in a shielded package integrally as a module.

With the above-noted arrangement, since the high frequency circuit in the input stage is built in a shielded package integrally as a module, it becomes possible to reduce negative effects of noise on the high frequency circuit, the noise being produced by those circuits handling digital signals such as digital visual and audio signals and upstream and downstream data signals, and to improve C/N, BER, and other properties. It also becomes possible to build digital circuits in a shielded housing of the network interface module as a module, to simplify the circuit arrangement, and to reduce cost, size and power consumption.

Further to the above arrangement, the visual and audio signal receiver circuit is preferably a tuner that is capable of both analogue and digital signals.

With the above-noted arrangement, it becomes possible to omit the arrangement for separation, to eliminate insertion loss caused by separator means. It also becomes possible to save space, to facilitate fabrication as a module, and to greatly reduce cost, size and power consumption.

In addition, the high frequency circuit further preferably includes a high frequency relay for a through output lead-out, the high frequency relay being provided to a stage prior to the visual and audio signal receiver circuit.

With the above-noted arrangement, since the high frequency relay does not consume as much space as an electronic switching circuit in enhancing applicability by providing a through output circuit, it becomes possible to facilitate fabrication as a module with other circuits, and to further reduce loss than a separator.

BRIEF DESCRIPTION OF DRAWINGS

FIG. 1 is a block diagram showing an electrical arrangement of a cable television set-top box in which a network interface module is mounted in accordance with an embodiment of the present invention.

DESCRIPTION OF THE EMBODIMENT

Figure 2:
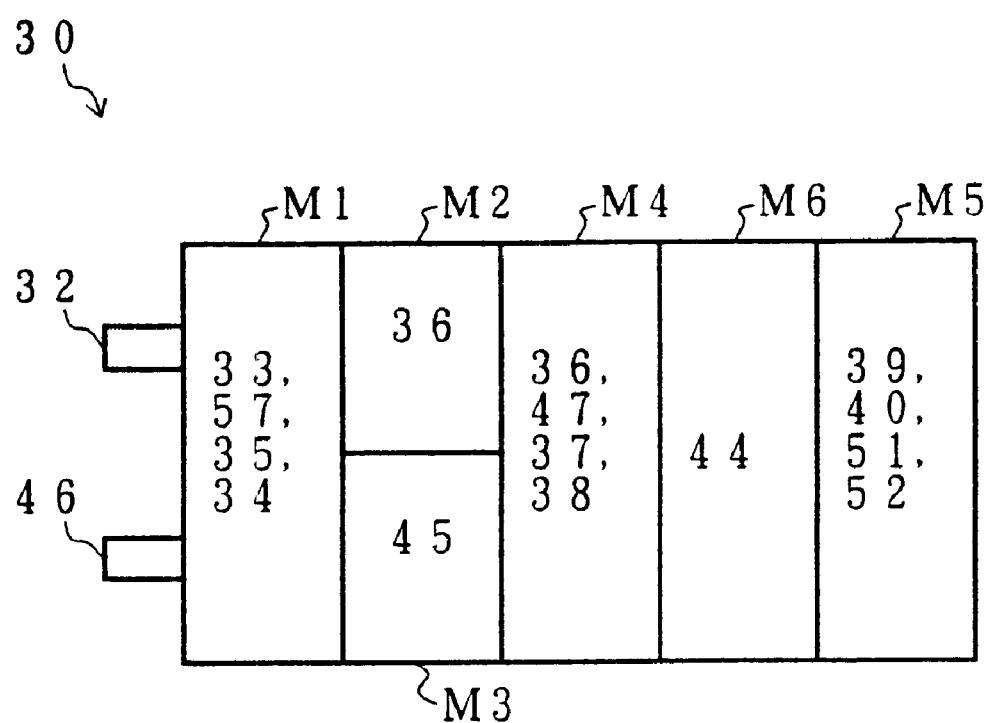
FIG. 2 is a front view illustrating a module layout of the network interface module shown in FIG. 1.

Referring to FIGS. 1 and 2, an embodiment in accordance with the present invention is explained in the following.

FIG. 1 is a block diagram showing an electrical arrangement of a set-top box 31, incorporating a network interface module 30 of an embodiment in accordance with the present invention, for receiving cable television broadcasting. A downstream signal ranging, for example, from 54 to 860 MHz is supplied to an input terminal 32 from a cable line, and an upstream signal ranging, for example, from 5 to 42 MHz is supplied for output to the cable line from the input terminal 32. The downstream signal is filtered by a high pass filter 33 that is an intermediate frequency filter having 5 to 46 MHz as an attenuation band and 54 MHz or higher as a passing band, and supplied for input to an analogue and digital common tuner 36 via a directional coupler 34 and a first connecting point S1 of a high frequency relay 35.

The analogue and digital common tuner 36 is constituted by a receiver circuit for a UHF band covering 470 to 860 MHz (B3 band), another one for VHF High band covering 170 to 470 MHz (B2 band), and another one for VHF Low band covering 54 to 170 MHz (B1 band). However, there is no particular specification for band separation.

An intermediate frequency signal of digital television broadcasting of the desired channel selected through the analogue and digital common tuner 36, having gone through a digital SAW filter 37, is supplied to a down converter 38 to be converted to an intermediate frequency signal of a low frequency, and converted to an 8- or 10-bit digital signal by an analogue/digital converter 39. The digital signal is I,Q-demodulated by a QAM demodulator 40, error-corrected, and supplied for output to a transport decoder 41 as a serial bit stream. The transport decoder 41 extracts visual and audio signals from the serial bit stream and supplies the extracted signals to an MPEG2 decoder 42. The MPEG2 decoder 42 decodes the bandwidth of the incoming visual and audio signals, and sends out the decoded signals to a multiplexer 43 as analogue NTSC composite visual and audio signals.

Meanwhile, an intermediate frequency signal of analogue television broadcasting of the desired channel selected through the analogue and digital common tuner 36 is demodulated into analogue NTSC composite visual and audio signals by an NTSC demodulator 44. The composite visual and audio signals from the MPEG2 decoder 42 and NTSC demodulator 44 are selected by the multiplexer 43, converted into a television signal of a desired channel such as channel 1, 2, or 13 by a high frequency modulator 45, and thereafter supplied for output to an antenna input terminal of a television set via a second connecting point S2 of the high frequency relay 35 from an output terminal 46.

In the present embodiment, the analogue and digital common tuner 36 is adopted that can be used for receiving and transmitting television signals of both analogue broadcasting and digital broadcasting, and an AGC switching circuit 47 is provided in association with the analogue and digital common tuner 36. An AGC voltage for automatic gain control has a gain that starts attenuating at different values and slopes for the reception of analogue broadcasting and the reception of digital broadcasting, enabling the analogue and digital common tuner 36 to be used for both analogue and digital broadcasting by switching the AGC voltage with the AGC switching circuit 47. The switching is done by a switching signal output so as to distinguish the reception of digital broadcasting during which the QAM demodulator 40 is sending out the serial bit stream from the reception of analogue broadcasting during which the QAM demodulator 40 is not sending out the serial bit stream, and the AGC switching circuit 47 receiving that switching signal.

The two connecting points S1 and S2 of the high frequency relay 35 are controlled so as to switch in an associated manner with each other: when the network interface module 30 is in operation, as mentioned earlier, the downstream signal from the directional coupler 34 is supplied at the first connecting point S1 for output to the analogue and digital common tuner 36, and at the same time the television signal from the high frequency modulator 45 is supplied at the second connecting point S2 for output to the output terminal 46; by contrast, when the network interface module 30 is standing by and in a through operation, the downstream signal from the directional coupler 34 is supplied directly for output to the output terminal 46 by connecting the first and second connecting points S1 and S2.

The downstream signal separated by the directional coupler 34 is supplied for input to the QPSK tuner 51 where a channel is selected, demodulated into a data signal by a QPSK demodulator 52, and thereafter supplied to a processor circuit 53 realised by a microprocessor and other components. Upstream data such as information on viewing fees, incidentally, is supplied for input to a QPSK modulator 54 from the processor circuit 53 to be modulated, amplified by a power amplifier 55, thereafter led in to a data terminal 56, and led out to the input terminal 32 via a low pass filter 57 that is an upstream circuit.

Judging whether the network interface module 30 is in a reception state or a standby state, the processor circuit 53 controls the connecting points S1 and S2 of the high frequency relay 35 so that the connecting points S1 and S2 switch in an associated manner with each other, controls the tuning frequency of the analogue and digital common tuner 36 and the switching state of the multiplexer 43, and performs a downstream data reception operation using the QPSK tuner 51 and the QPSK demodulator 52 and an upstream data transmission operation using the QPSK modulator 54 and the power amplifier 55.

With the network interface module 30 structured in the above manner, in the present embodiment, an input stage circuit including the high pass filter 33, the low pass filter 57, the directional coupler 34, and the high frequency relay 35 is built in a shielded package integrally as a high frequency module M1. A part of the analogue and digital common tuner 36 and the high frequency modulator 45 are built in respective shielded packages as modules M2 and M3. A digital circuit including the remaining of the analogue and digital common tuner 36, the digital SAW filter 37, the down converter 38, and the AGC switching circuit 47 is built in a shielded package integrally as a module M4. A digital circuit including the analogue/digital converter 39, the QAM demodulator 40, the QPSK tuner 51, and the QPSK demodulator 52 is built in a shielded package integrally as a module M5. The NTSC demodulator 44, that is an analogue circuit, is built in a shielded package as a module M6. Further, the modules M1, M2, M3, M4, M5, and M6 are built integrally in a shielded housing of the network interface module 30, for example, in a layout shown in FIG. 2.

Figure 3:
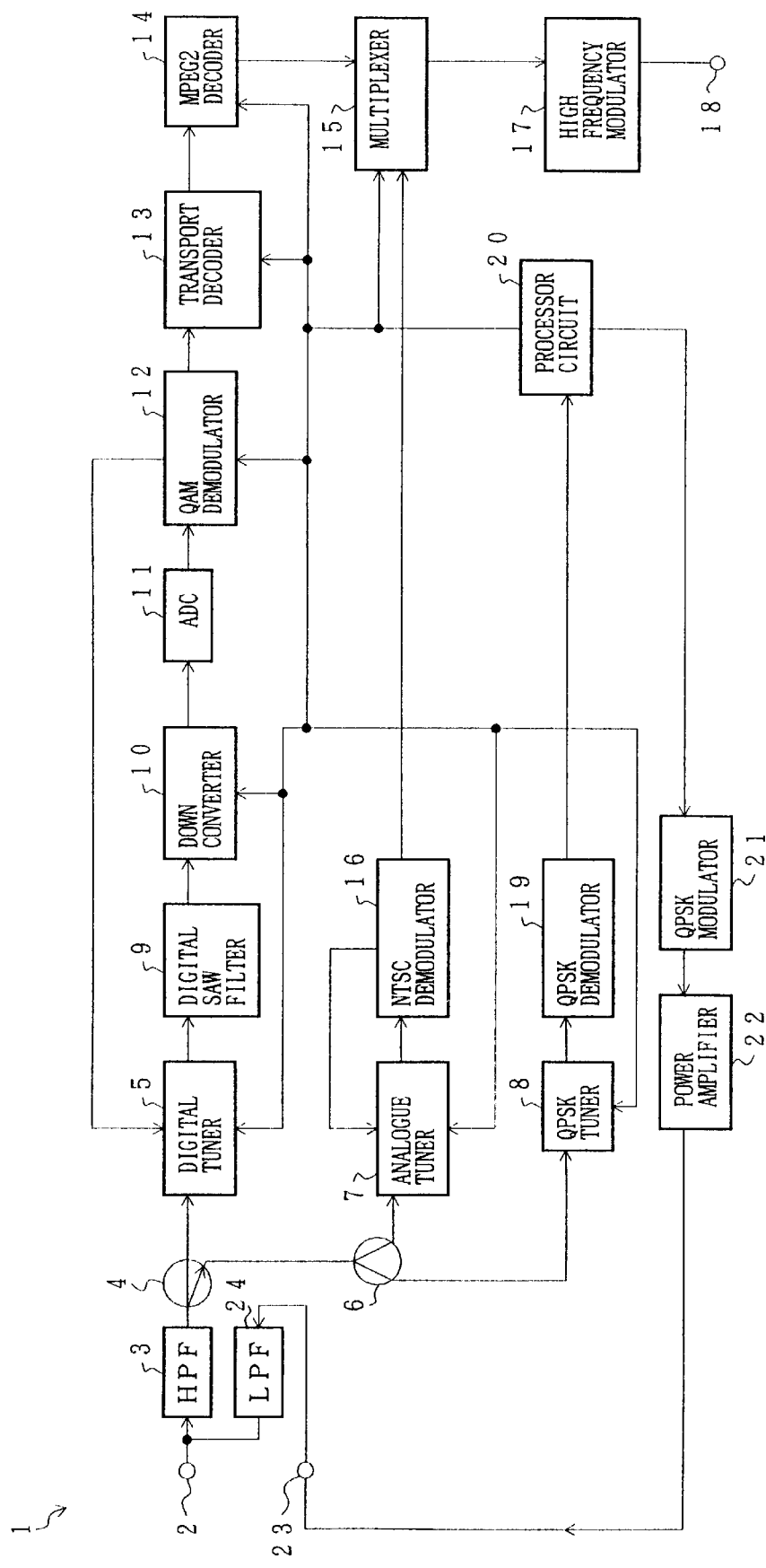
FIG. 3 is a block diagram showing an electrical arrangement of a typical conventional set-top box.

Accordingly, it becomes possible to prevent digital noise and high frequency noise from being produced in high frequency circuits by digital circuits, and to greatly improve properties such as C/N, BER, and phase noise. Also, by fabricating the circuits as modules and sharing the single tuner between digital and analogue modes, it becomes possible to cut costs and power consumption by, for example, about 20%. Moreover, since a smaller amount of heat is generated as a result of a cut in power consumption, although the circuits are fabricated as modules, heat can be prevented from degrading the reliability. Further, by sharing the single tuner between digital and analogue modes, it becomes possible to omit a separator and to make improvements on insertion loss from the input terminal 32 to the analogue and digital common tuner 36 by, for example, about 2 dB over the conventional technology shown in FIG. 3.

Particularly, in the shielded housing shown in FIG. 2, the modules M1, M2, M3, M4, M5, and M6 share common external surfaces with adjacent modules, and the shielded housing is fabricated so that the external surfaces thereof act as the external surfaces of the modules M1, M2, M3, M4, M5, and M6. The modules M1, M2, M3, M4, M5, and M6 thus structured, although separated by shielding plates to prevent the circuit blocks from interfering with another other, have a simple arrangement compared to those modules being built as separate individual modules, and facilitates a reduction in cost and size.

Also, in the shielded housing, the signal path shown in the block diagram of FIG. 1 is rendered shortest by providing the modules M2 and M3 to a stage following the module M1, the modules M4, M5, and M6 to a stage following the modules M2 and M3. In addition, the pattern is laid out, especially in the QAM demodulator 40, so that the +B line and earth pattern of the digital processing section are separated from the +B line and earth pattern of the analogue processing section. Consequently, BERT (Bit Error Rate) is improved.

Moreover, due to the large amount of heat generated by the QAM demodulator 40, the network interface module 30 of the present embodiment has a shielded housing that is attached to the housing of the set-top box in such a manner that the shielded housing is in direct contact with the housing of the set-top box. Also, the lid section of the shielded housing is provided with a punch hole for heat radiation. This improves heat radiation effect and prevents destruction and malfunction of the network interface module 30, which otherwise could be caused by the heat generated by the QAM demodulator 40.

Furthermore, by providing a through output circuit, it becomes possible to produce an output transmitted to other set-top boxes 31, to cascades a plurality of set-top boxes 31, and to enhance applicability. In addition, being realised by a high frequency relay 35, the through circuit occupies less space than an electronic switching circuit, as mentioned earlier, is readily made into a module with other circuits such as the high pass filter 33, the low pass filter 57, and the directional coupler 34, and causes a smaller loss than in a case where it is realised by a separator. Moreover, since the branching of such a through circuit is done at the visual and audio signal line, the QPSK tuner 51 receiving a downstream data signal can be always supplied with the above-noted downstream signal by the directional coupler 34, data from a company can be received surely even during standby.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A network interface module for receiving cable television broadcasting, comprising:

a low-pass filter for transmitting an upstream signal to a cable television station;

a high-pass filter for blocking the upstream signal and receiving a downstream signal from the cable television station; and a directional coupler for supplying the downstream signal to a visual and audio signal receiver circuit and a control signal receiver circuit, wherein said low pass filter, said high pass filter, and said directional coupler form a high frequency circuit built in a shielded package integrally as a module, wherein said high frequency circuit further includes a high frequency relay for a through output lead-out, said high frequency relay being provided to a stage prior to said visual and audio signal receiver circuit, wherein said high frequency relay includes:

a first switch for connecting said directional coupler to said visual and audio signal receiver circuit while said network interface module is in operation; and a second switch for coupling a visual and audio output of said network interface module to an output terminal while said network interface module is in operation, and for connecting said directional coupler to the output terminal via the first switch while said network interface module is in standby.

2. The network interface module as set forth in claim 1, wherein said visual and audio signal receiver circuit is a tuner that is capable of both analogue and digital signals.

3. The network interface module as set forth in claim 1, wherein said high frequency circuit and said visual and audio signal receiver circuit are built respectively in shielded packages integrally as modules, the two modules each have an external surface at least a part of which is commonly shared between the two modules, and said network interface module has an external surface at least a part of which is commonly shared between said network interface module and the two modules.

4. The network interface module as set forth in claim 2, wherein said high frequency circuit and said visual and audio signal receiver circuit are built respectively in shielded packages integrally as modules, the two modules each have an external surface at least a part of which is commonly shared between the two modules, and said network interface module has an external surface at least a part of which is commonly shared between said network interface module and the two modules.

5. The network interface module as set forth in claim 2, further comprising an AGC switching circuit for switching an AGC voltage for automatic gain control of the analogue and digital common tuner according to whether digital or analogue broadcasting is being received.

* * * * *